US008832303B2

(12) United States Patent
Vasa (10) Patent No.: US 8,832,303 B2
(45) Date of Patent: Sep. 9, 2014

(54) METHOD AND APPARATUS FOR CREATING DYNAMIC PHONE PAGES DUE TO TRIGGERING EVENTS FROM AN EXTERNAL SOURCE

(75) Inventor: Yojak Harshad Vasa, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1408 days.

(21) Appl. No.: 12/132,211

(22) Filed: Jun. 3, 2008

(65) Prior Publication Data
US 2008/0313337 A1 Dec. 18, 2008

Related U.S. Application Data

(60) Provisional application No. 60/944,377, filed on Jun. 15, 2007.

(51) Int. Cl.
G06F 15/16 (2006.01)
H04L 29/08 (2006.01)
H04M 3/42 (2006.01)

(52) U.S. Cl.
CPC ........... *H04M 3/42068* (2013.01); *H04L 67/16* (2013.01); *H04M 2201/38* (2013.01)
USPC ............ 709/232; 709/203; 709/217; 709/227

(58) Field of Classification Search
CPC ................... H04M 3/42068; H04M 2201/38; H04L 67/16
USPC .................................. 709/203, 217, 227, 232
See application file for complete search history.

(56) References Cited

U.S. PATENT DOCUMENTS

| | | | |
|---|---|---|---|
| 6,917,950 B2 * | 7/2005 | Mcbride et al. | 707/203 |
| 6,922,721 B1 | 7/2005 | Minborg | |
| 6,977,909 B2 | 12/2005 | Minborg | |
| 6,996,072 B1 | 2/2006 | Minborg | |
| 7,383,320 B1 * | 6/2008 | Silberstein et al. | 709/219 |
| 7,415,486 B2 * | 8/2008 | Multer | 707/201 |
| 2002/0010807 A1 * | 1/2002 | Multer et al. | 709/328 |
| 2002/0029227 A1 * | 3/2002 | Multer et al. | 707/203 |
| 2004/0006694 A1 | 1/2004 | Heelan et al. | |
| 2004/0054711 A1 * | 3/2004 | Multer | 709/201 |
| 2004/0133629 A1 * | 7/2004 | Reynolds et al. | 709/202 |
| 2004/0198329 A1 * | 10/2004 | Vasa | 455/414.1 |
| 2005/0044165 A1 * | 2/2005 | O'Farrell et al. | 709/213 |
| 2005/0271041 A1 | 12/2005 | Minborg | |

(Continued)

FOREIGN PATENT DOCUMENTS

WO 01/78427 A1 10/2001

OTHER PUBLICATIONS

PCT—International Search Report dated Nov. 20, 2008, for Application No. PCT/US2008/066710, Filed Jun. 12, 2008.

*Primary Examiner* — Phuoc Nguyen
(74) *Attorney, Agent, or Firm* — Coats and Bennett, P.L.L.C.

(57) ABSTRACT

Methods and apparatus for sending a dynamically updated data object to a user of a communication device are disclosed. An exemplary method comprises receiving updated data from an external source at a first communication device and updating a stored data object with the updated data. Upon the occurrence of a trigger, the updated data object, which comprises the updated information, is transferred to a second communication device.

13 Claims, 5 Drawing Sheets

(56) References Cited

U.S. PATENT DOCUMENTS

2006/0114845 A1 6/2006 Minborg
2006/0206534 A1* 9/2006 Banks et al. .................. 707/200
2008/0071898 A1* 3/2008 Cohen et al. .................. 709/223

* cited by examiner

METHOD AND APPARATUS FOR CREATING DYNAMIC PHONE PAGES DUE TO TRIGGERING EVENTS FROM AN EXTERNAL SOURCE

RELATED APPLICATIONS

The present application claims priority under 35 U.S.C. Section 119(e) to U.S. Provisional Patent Application Ser. No. 60/944,377, filed 15 Jun. 2007, the entire contents of which are incorporated by reference herein.

TECHNICAL FIELD

The present invention relates generally to a method and apparatus for exchanging information in a communication system. More specifically, the invention relates to methods and apparatus for transferring data objects in connection with a communication session between two or more communication terminals.

BACKGROUND

With the convergence of voice and data communication networks, portable communication devices are increasingly likely to support several communication modes, as well as a number of communication-related applications. Single-purpose cellular phones and alphanumeric pagers have given way to complex mobile devices supporting voice communications, e-mail, and instant messaging. A typical device often includes a camera, a music player, and sound recorder, and may include a global positioning system (GPS) receiver. Many of these devices and their supporting wireless networks now enable simultaneous use of multiple communication modes. Thus, a device user today might engage in a voice call and simultaneously send or receive text messages, digital images, video clips, or the like.

A few applications have been developed to take advantage of this simultaneous availability of multiple communication modes. In particular, several patents and patent application publications describe a so-called Phone Pages system, in which the generation and transfer of multimedia data objects is triggered by various communication-related events. These data objects, or Phone Pages, thus supplement a primary communication session, such as a voice call, an e-mail exchange, or an instant message conversation. The Phone Pages concept is described in the following patents and patent application publications, the contents of which are each incorporated by reference herein: U.S. Pat. No. 6,922,721, titled "Exchange of Information in a Communication System" and issued on Jul. 26, 2005 to Minborg et al.; U.S. Patent Application Publication 2005/0271041 A1, titled "Exchange of Information in a Communication System" and filed on Jun. 1, 2005 by Minborg et al.; U.S. Pat. No. 6,996,072, titled "Method and Apparatus for Exchange of Information in a Communication Network" and issued on Feb. 7, 2006 to Minborg; U.S. Pat. No. 6,977,909, titled "System and Method for Exchange of Information in a Communication Network" and issued on Dec. 20, 2005 to Minborg; and U.S. Patent Application Publication 2006/0114845, also titled "System and Method for Exchange of Information in a Communication network" and filed on Nov. 14, 2005 by Minborg.

The communication techniques and systems described in the preceding references provide a variety of enhancements to conventional modes of communication, facilitating the convenient exchange of various data objects between users of communication devices. These enhancements may be quite valuable both for promoting personal relationships and for supporting business and enterprise communications. However, further enhancements are needed to ensure that appropriate data objects are transferred at appropriate times, and to ensure that data objects are updated with timely information.

SUMMARY

As noted above, enhancements to current systems for exchanging data objects in a communication system are needed. In particular, current systems and methods do not provide the ability to incorporate triggers from external sources, e.g. servers that are separate from the phone pages server or servers used to store the phone pages/data objects. Thus, in some embodiments, when a user receives an update from a third party server, such as weather or airline information, for example, this information may get updated on the user's phone page. In some embodiments, the dynamically changing phone page may then be shared with the user. In addition, in some embodiments, if the update is received by User A via an RSS feed, for example, User A may want to share the information with User B.

According to one embodiment of the systems and methods described herein, a method for sending a data object to a user of a communication device is provided. The method comprises the steps of: receiving updated data from an external source at a first communication device; updating a stored data object with the updated data; and transferring, upon the occurrence of a trigger, the updated data object to a second communication device, wherein the data object comprises the updated data or information.

In another embodiment of the various systems and methods described herein, a communication device is disclosed. The communication device comprises processing logic configured to carry out one or more of the methods disclosed herein. In particular, some embodiments of a communication device include processing logic configured to receive updated data from an external source and to update a stored data object with the updated data. Upon the occurrence of a trigger, the processing logic is configured to transfer the updated data object to a second communication device.

In some embodiments, the processing logic of the communication device may be configured to update one or more data objects stored on the communication device itself. In other embodiments, the processing logic may be configured to instead update the stored data object by sending a request to a data object server to update the stored data object. In several embodiments, the processing logic may be configured to transfer the updated data object directly to the second communication device. In others, the processing logic may be configured to instead send a request to a data object server to send the updated data object to the second communication device. In some embodiments, the processing logic may be further configured to store the updated data object in addition to the (un-updated) data object and to select, in response to one or more user commands, the updated data object or the data object for display to the user.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

The invention will now be more thoroughly described and features and advantages will become readily apparent by reading the following detailed description, where references will be made to the accompanying figures, where.

DETAILED DESCRIPTION

The present invention is described below in reference to a wireless telecommunications system providing voice and data services to a mobile device. Various systems providing voice and data services have been deployed, such as GSM networks (providing circuit-switched communications) and GPRS (providing packet-switched communications); still others are currently under development. These systems may employ any or several of a number of wireless access technologies, such as Time Division Multiple Access (TDMA), Code Division Multiple Access (CDMA), Frequency Division Multiple Access (FDMA), Orthogonal Frequency Division Multiple Access (OFDMA), Time Division Duplex (TDD), and Frequency Division Duplex (FDD). The present invention is not limited to any specific type of wireless communication network or access technology. Indeed, those skilled in the art will appreciate that the network configurations discussed herein are only illustrative. The inventive techniques disclosed herein may be applied to "wired" devices accessing conventional voice or data networks, as well as wireless devices. The invention may be practiced with devices accessing voice and/or data networks via wireless local area networks (WLANs) or via one or more of the emerging wide-area wireless data networks, such as those under development by the 3rd-Generation Partnership Project (3GPP).

Figure 1:
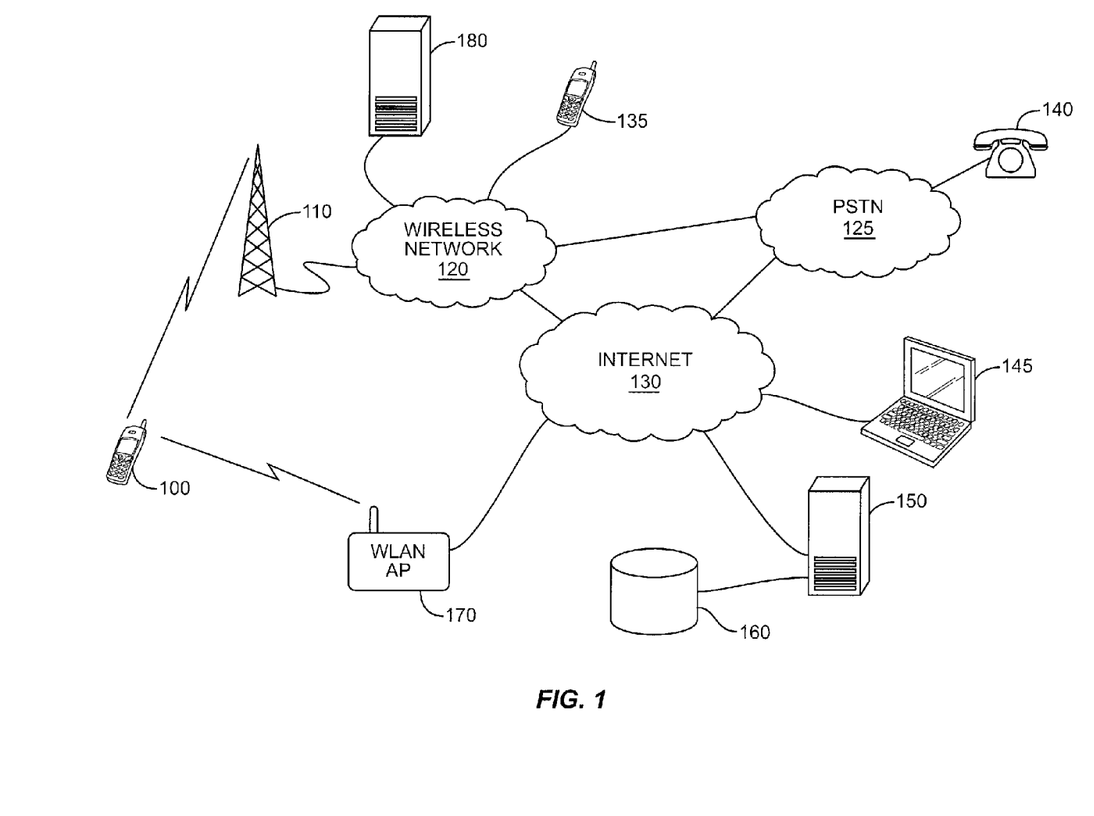
FIG. 1 illustrates an overview of a communication infrastructure overview according to one embodiment of the invention.

FIG. 1 illustrates an exemplary communication system in which the present invention may be employed. Communication device 100 communicates with other devices through base station 110, which is connected to wireless network 120. Wireless network 120 is in turn connected to the Public Switched Telephone Network (PSTN) 125 and the Internet 130. Wireless device 100 can thus communicate with various other devices, such as wireless device 135, conventional landline telephone 140, or personal computer 145. In FIG. 1, wireless device 100 also has access to data server 150 via the Internet 130; data server 150 may be configured to provide access through Internet 130 to data or applications stored in storage device 160. Storage device 160 may comprise one or more of a variety of data storage devices, such as disk drives connected to data server 150 or one or more other servers, a Redundant Array of Independent Drives (RAID) system, or the like.

Communication device 100 may be a cordless telephone, cellular telephone, personal digital assistant (PDA), communicator, computer device, or the like, and may be compatible with any of a variety of communications standards, such as the Global System for Mobile Communications (GSM) or one or more of the standards promulgated by 3GPP. Communication device 100 may include a digital camera, for still and video images, as well as a digital sound recorder and digital music player application. Communication device 100 may also support various applications in addition to voice communications, such as e-mail, text messaging, picture messaging, instant messaging, video conferencing, web browsing, and the like.

Communication device 100 also includes a wireless local-area network (WLAN) transceiver configured for communication with WLAN access point 170. WLAN access point 170 is also connected to Internet 130, providing communication device 100 with alternative connectivity to Internet-based resources such as data server 150.

Also connected to wireless network 120 is location server 180. Location server 180 is typically maintained by the operator of wireless network 120, but may be separately administered. The main function of location server 180 is to determine the geographic location of mobile terminals (such as mobile terminal 100) using the wireless network 120. Location information obtained by location server 180 may range from information identifying the cell currently serving mobile terminal 100 to more precise location information obtained using Global Positioning System (GPS) technology. Other technologies, including triangulation methods exploiting signals transmitted from or received at several base stations, may also be used to obtain location information. Triangulation techniques may include Time Difference of Arrival (TDOA) technology, which utilizes measurements of a mobile's uplink signal at several base stations, or Enhanced-Observed Time Difference (E-OTD) technology, which utilizes measurements taken at the mobile terminal 100 of signals sent from several base stations. GPS-based technologies may include Assisted-GPS, which utilizes information about the current status of the GPS satellites derived independently of the mobile terminal 100 to aid in the determination of the terminal's location.

In some embodiments, the various systems and methods described herein facilitate the selective delivery of data objects to a communication device, such as mobile terminal 135, in communication with another device, such as mobile terminal 100. The data object may be transferred from one device to the other, e.g., from mobile terminal 100 to mobile terminal 135, or from a data object server, such as server 150 or server 180, in response to a request from either of the communication devices.

Typically, the users of the communication devices are engaged in a communication session, which may comprise a voice call (whether circuit-switched or packet-switched), an instant message (IM) session, or any other modes of communication such as those described herein or combinations thereof. In some embodiments, one or both of the communication devices may include a module or application that is able to determine the occurrence of a communications-related trigger event in the communication device and to thereafter transmit and/or receive data, such as data specifically related to the trigger event. The trigger event may comprise, for example, any of the following events or combinations thereof:

the establishment of a session or call between the devices;
 the arrival or departure of a device in a multi-party communication session;
 activation by the user of one or both of the communication devices (e.g., an explicit request by one user for transfer of a data object to the other);
 timer-based periodic or random trigger event in communication device;
 crossing a geographic boundary, such as a boundary established by the user of one of the communication devices; or other events related to the communication, such as those described in U.S. Pat. No. 6,996,072.

Other trigger events might include, but are not limited to:

An outgoing call is or is about to be initiated.

A called party answers a call.

A called party is busy.

A called party does not answer after a pre-determined time or number of rings.

A called party rejects a call.

A called party is unavailable (e.g., an addressed mobile phone is out of coverage).

An incoming call is imminent or has just started.

A conference call is or is about to be initiated.

A call is disconnected.

A call is conducted (under which several triggering events can be generated).

A party is placed on hold.

The location of a party has changed.

A communication device is switched on or off.

A special-function button is pressed on a communication device.

A button or other user interface device is activated in response to a query.

A voice mail, text message, e-mail, instant message, or the like is received.

A voice mail, text message, e-mail, instant message, or the like is received.

While many of the preceding trigger events are related to traditional voice communications, those skilled in the art will appreciate that many analogous trigger events will apply to other communication modes, such as instant messaging, e-mail, video conferencing, "chat" sessions, and so on.

According to some embodiments of the present invention, the various systems and methods described herein may be configured to provide the ability to incorporate triggers (e.g., the provision of new data or information) received from external sources (e.g., sources that are separate from the phone page servers storing phone pages). Thus, in some embodiments, when a user receives an update from a third party server, such as weather or airline information, for example, this information may get updated on the user's phone page. In some embodiments, this dynamically updated phone page may then be shared by the user and others approved by the user. For example, in some embodiments, updates received by User A may be shared with User B during a communication session.

In some embodiments, the various systems described herein may dynamically generate information that could be relevant for sharing between individuals communicating via phone pages or data objects in a session. The two instances mentioned above, i.e., weather information and flight information, are just examples; virtually any other received data or information may be relevant and trigger the dynamic updating of a phone page. In some embodiments, a user (e.g., User A) receiving such data or information may define which types of data or information may be accepted for use in updating his or her phone page. For example, a user may prefer to accept updated data or information relating to weather, but not data or information relating to upcoming events. Thus, as updated data or information is received at User A's terminal, such as, for example, via RSS feed or Widgets, the user's phone page or data object may be changed or modified to incorporate the information. In some embodiments, phone pages or data objects may be updated directly by User A's terminal itself, in response to the triggering information. In other embodiments, an information source (e.g., a third party server) may be linked to the phone page server maintaining the phone pages/data object; in this case the dynamic updating of User A's phone could occur as a separate transaction between the third party server and the phone page server. This way, when User A calls User B, triggering the sharing of a phone page, the up-to-date information may be shared with User B via the dynamically updated phone pages.

Figure 2:
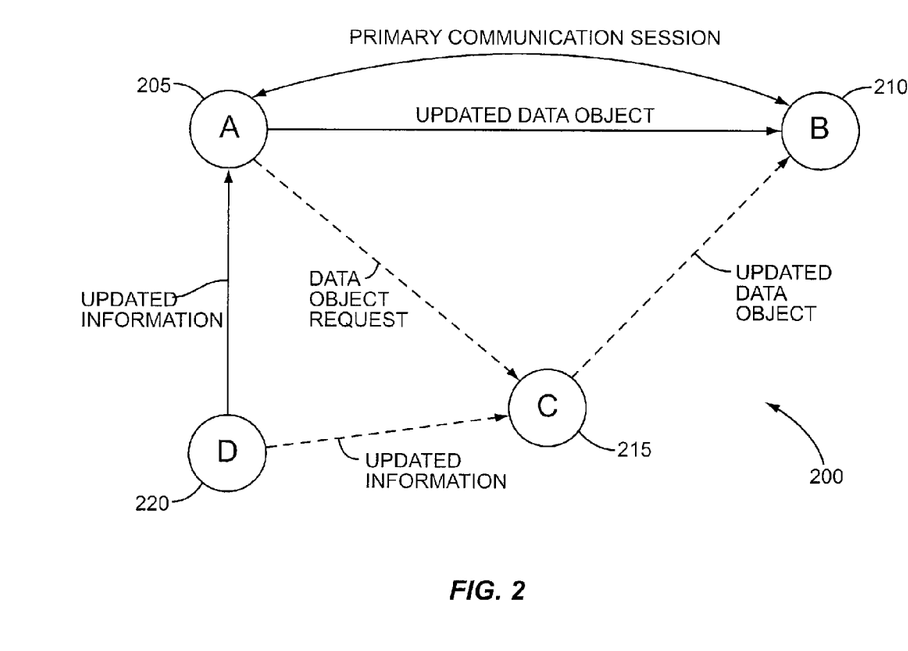
FIG. 2 provides a simplified view of a system for supporting delivery of data objects according to some embodiments of the invention.

FIG. 2 illustrates a system 200 depicting a first communication device A 205, a second communication device B 210, a data object server C 215, and an external server D 220. In some embodiments, communication devices A 205 and B 210 may comprise any of the User Equipments (UE) described in this application, such as, for example, UE 100 of FIG. 1, and data object server 215 may comprise any of the data object servers described herein, such as data object server 150 of FIG. 1. External server D 220 may comprise any server or other device that may transmit data or information to communication devices A 205 or B 210, or to data object server C 215. Those skilled in the art will appreciate that the various pictured devices may communicate via conventional means using public and/or private data networks, including the Internet, and using conventional communication protocols. The details of these communications are not necessary to an understanding of the present invention, and are thus not provided herein.

In some embodiments, the various systems and methods described herein may enable the users of communication devices A 205 and B 210 to—upon the occurrence of a trigger event, for example—transmit and receive phone pages. In some embodiments, such phone pages may comprise data or information that is incorporated into a phone page and which is received from an external source, such as a third party database, or any other data or information that may be transmitted via data objects or phone pages. Such data or information may be stored within each such device or within a remote server, database or other storage device.

As shown, the users of communication devices A 205 and B 210 are engaged in a primary communication session. Such a communication session may comprise a voice call (e.g., circuit or VoIP), instant message (IM) session, or any other modes of communication such as those described herein or combinations thereof. In some embodiments, communication device A 205 and/or communication device B 210 may each include a module(s) or application(s) that permit(s) the user to: (1) receive information from external sources, such as third party databases, (2) select whether phone pages should be shared, (3) scroll through phone pages, and (4) transfer data objects to other devices, either verbally, autonomously or with the assistance of another entity attached to the communication network, such as, for example, an external server or a database (e.g., the Phone Pages database). In some embodiments, information received from third party servers, such as weather or flight information, for example, may be incorporated into the corresponding user's phone page(s) and thereafter selectively shared with other appropriate users.

In some embodiments, during the session or call with communication device B 210, a triggering event may occur at communication device A 205. Such trigger may occur, for example, upon receiving updated information from an external server, such as a server that provides weather information or flight information, for example. Thus, communication device A 205 might receive updated information indicating that its flight will be departing 30 minutes later than the original scheduled time. This information may then be incorporated into one or more phone pages or data objects associated with the communication device A 205. In some embodiments, the updated information may be provided directly to the data object server 215 by external server D 220. In some embodiments, data object server 215 may update the data object with the updated information.

In some embodiments, on the trigger event, an application in communication device A 205 may query the user of communication device A 205 whether the updated information (i.e., the delayed departure time of the flight) may be shared with the user of communication device B210. Upon confirmation that the updated data object is to be shared, an application in communication device A 205 may initiate an asynchronous trigger, for example, that updates the data object for purposes of the session with communication device B 210. In this manner, the data object gets refreshed with the updated information during the session with communication device B 210. In some embodiments, the user of communication device B 210 may be notified of the data object update, or the updated page may be sent by communication device A 205 to communication device B 210 and presented to the user thereof. In some embodiments, when the updated information was provided to data object server C 215, communication device A 205 may transmit a request to data object server C 215 for it to send the updated data object to communication device B 210 containing the data or information provided by the external server. In some embodiments, the request to data object server C 215 may include the identity of communication device B 210.

In some embodiments, the users of communication device A 205 and communication B 210 may also want to store a history of the current page on the terminal or on the server as this may be pertinent to the conversation at hand. In some embodiments, a user interface of communication device A 205 or communication device B 210 may permit the respective user to scroll through the data objects as they have been built or queued with simple forward and back commands. Thus, any of the current data objects or previous versions of the data objects may be displayed to the user, or transmitted to another communication device. In some embodiments, the built or queued data objects may be stored in communication A 205, communication device B 210, data object server C 215, or any database or other storage device.

Figure 3:
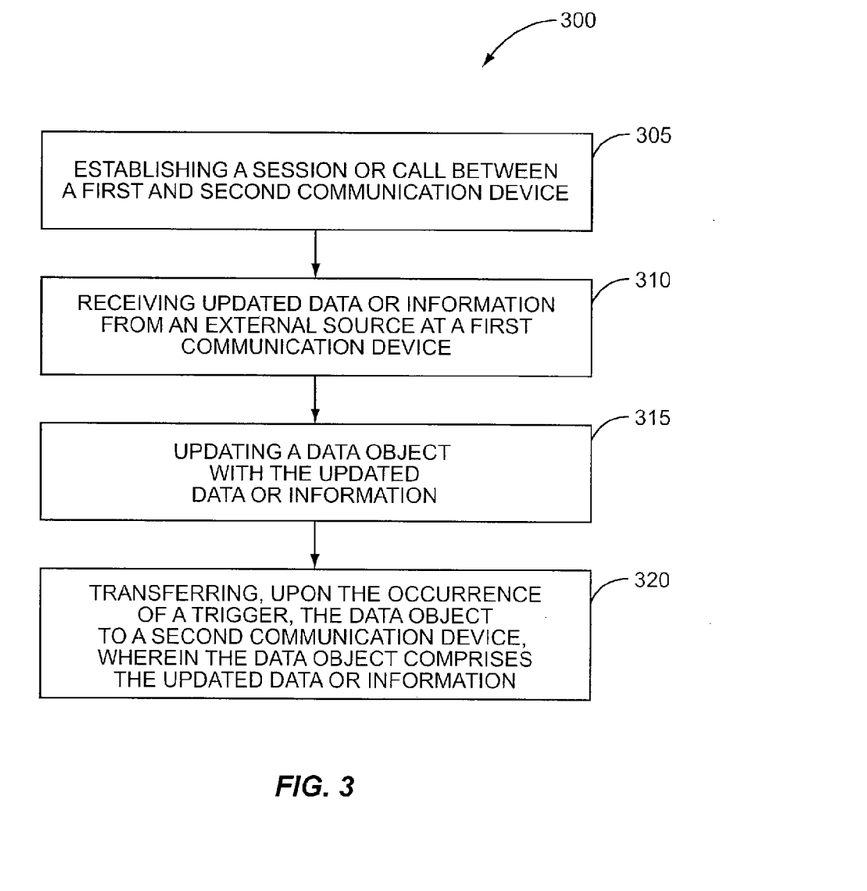
FIG. 3 is a logic flow diagram illustrating an exemplary method for supporting delivery of data objects.

FIG. 3 illustrates an embodiment of a method 300 for sending a data object to a user of a communication device. At step 305, a session or call is established between first and second communication device. At step 310, the first communication device receives updated data or information from an external source. In some embodiments, the external source may comprise a server. At step 315, the first communication device may update a data object with the updated data or information. At step 320, upon the occurrence of a trigger and receipt of consent, the first communication device may send the updated data object to a second communication device, or transmit a request to a data object server to send the updated data object to the second communication device.

Figure 4:
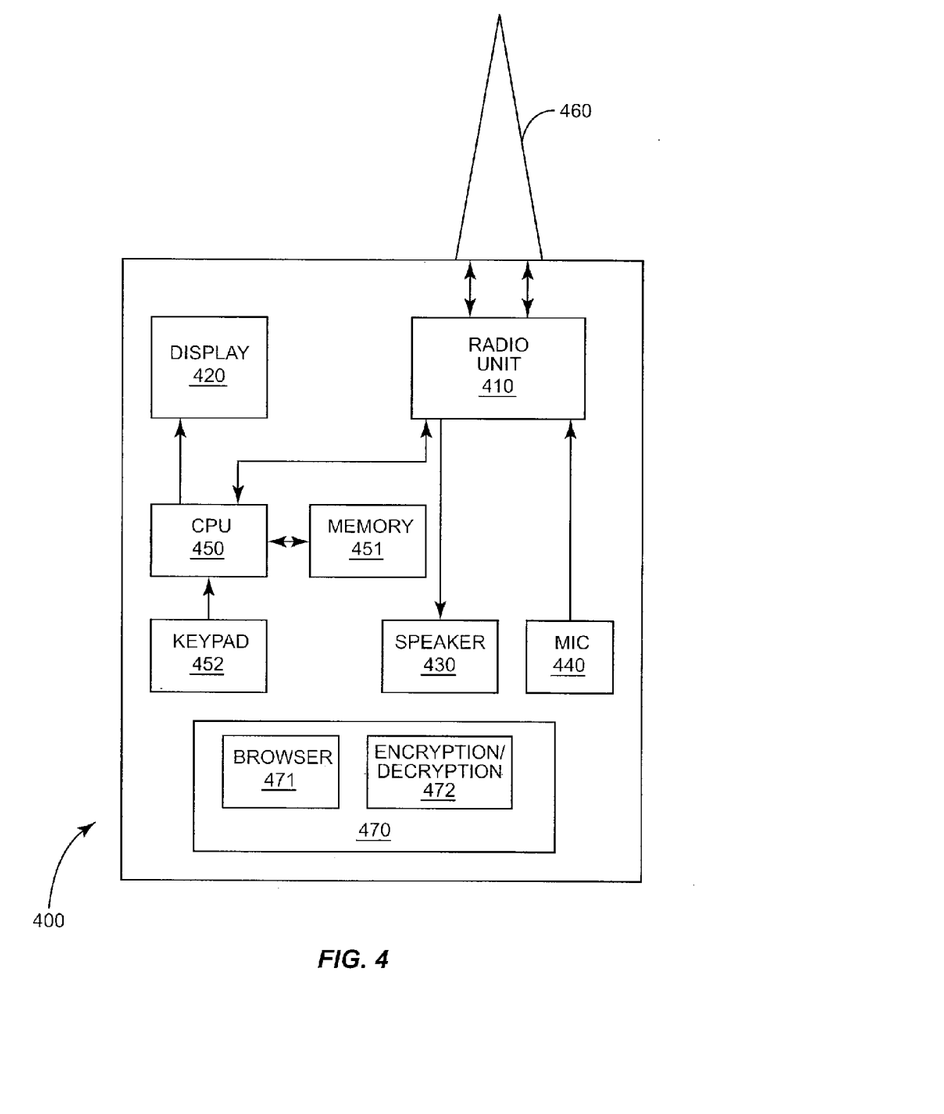
FIG. 4 is a block diagram illustrating an exemplary communication device.

FIG. 4 illustrates an exemplary communication device 400 to be used in one or more embodiments of the present invention. In the pictured embodiment, communication device 400 may comprise a mobile telephone, or a personal digital assistance (PDA) device with mobile telephone capabilities. Communication device 400 includes a central processing unit (CPU) 450, connected to at least one memory unit 451, and at least one display 420. The CPU 450 may also be connected to a keyboard device or area 452 to allow subscribers to enter, for example, digits or alphanumeric characters. The memory unit 451 may include non-volatile memory (e.g., flash, EEPROM or SIM card) in order to retain stored information, should power be temporarily unavailable.

The CPU 450 is further connected to a radio unit 410 configured to convert incoming and outgoing data to and from radio frequency (RF) modulated signals. The radio unit 410 also connects to an antenna 460 for transmission and reception of the RF signals. Radio unit 410 may also directly or indirectly be connected to an earphone 430 and a microphone 440 in order to allow voice communication. Communication device 400 may further comprise a plurality of programs 470, such as a browser 471, that can render at least one type of data object, and an encryption/decryption engine 472, allowing data object requests to be encrypted and data objects to be decrypted. Communication device 400 may optionally be equipped with a cache memory in which it is possible to store and retrieve data objects without occupying transmission resources within the communication network.

In some embodiments of the present invention, CPU 450 and/or other processing logic included in communication device 400 is configured in accordance with one or more of the systems or techniques described above. In particular, communication device 400 may comprise processing logic configured to receive updated data from an external source at a first communication device and to update a stored data object associated with the first communication device using the updated data. The processing logic may be further configured to transfer, upon the occurrence of a trigger, the updated data object to a second communication device, wherein the updated data object comprises the updated data.

In some embodiments, the processing logic of communication device 400 may be configured to update one or more data objects stored on the communication device 400 itself, e.g., in memory unit 451. In other embodiments, the processing logic may be configured to instead update the stored data object by sending a request to a data object server to update the stored data object.

In several embodiments, the processing logic may be configured to transfer the updated data object directly to the second communication device. In others, the processing logic of communication 400 may be configured to instead send a request to a data object server to send the updated data object to the second communication device. In some embodiments, the processing logic may be further configured to store the updated data object in addition to the (un-updated) data object and to select, in response to one or more user commands, the updated data object or the data object for display to the user.

Figure 5:
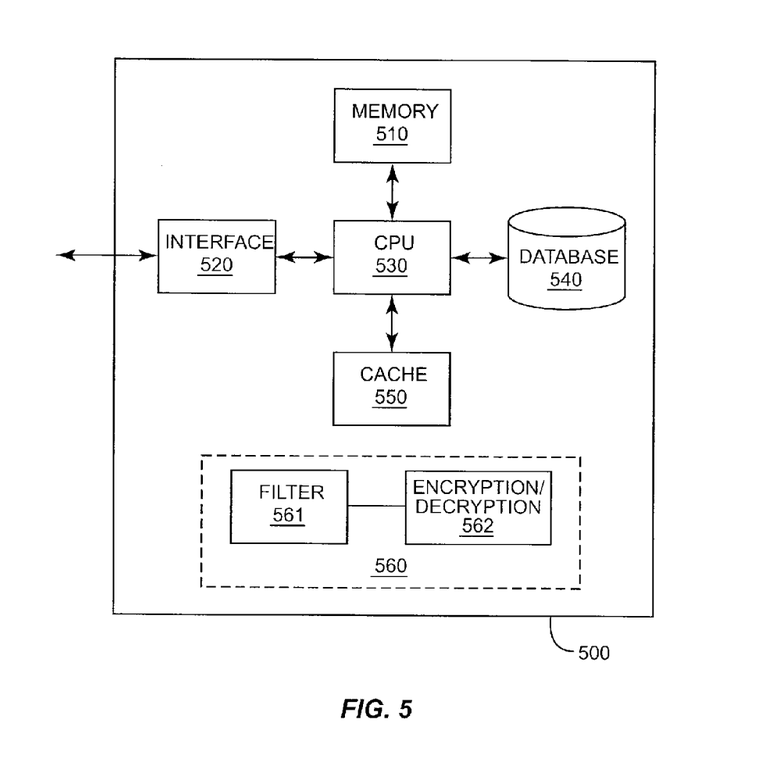
FIG. 5 is a block diagram illustrating an exemplary data object server.

FIG. 5 illustrates an exemplary communication server and/or data object server 500 according to one or more embodiments of the present invention. Server 500 comprises at least one CPU 530 connected to at least one memory device 510, a cache memory 550, at least one database 540 and at least one network interface 520. Memory devices 510 and databases 540 may include non-volatile memory, such as flash, magnetic, or optical storage devices. Network interface 520 enables the CPU 530 to send and receive data to/from the data network 130. The cache memory 550 allows storage of frequently used data objects so that the CPU 530 may obtain them readily. The database 540 contains the actual data objects that can be requested by a communication device, such as communication device 400, via, for example, the wireless network 120 and Internet 130 pictured in FIG. 1. The data object server may further comprise a number of programs 560 including, but not limited to, a filter 561, allowing the data objects to be optimized according to the rendering capabilities of the communication device 400, and an encryption/decryption engine 562, allowing data object requests to be decrypted and data objects to be encrypted. In some embodiments of the present invention, the processing logic of server 500 is configured to carry out one or more of the methods described above.

Those skilled in the art will appreciate that the various functions of communication device 400 and server 500 may be performed using various combinations of hardware and software. Accordingly, each of the described processing blocks may in some embodiments directly correspond to one or more commercially available or custom microprocessors, microcontrollers, or digital signal processors. In other embodiments, however, two or more of the processing blocks or functional elements of device 400 or data object server 500 may be implemented on a single processor, while functions of other blocks are split between two or more processors. Likewise, memories 451 and 510 are representative of the one or more memory devices containing the software, firmware, and data used to implement functionality in accordance with one or more embodiments of the present invention. Thus, these memory devices may include, but are not limited to, the following types of devices: cache, ROM, PROM, EPROM, EEPROM, flash, SRAM, and DRAM.

Those skilled in the art should appreciate that the present invention broadly provides methods and apparatus for supporting delivery of a data object used to alert a called party to a call from a calling party. The present invention may, of course, be carried out in other specific ways than those herein set forth without departing from the scope and essential characteristics of the invention. Thus, the present invention is not limited to the features and advantages detailed in the foregoing description, nor is it limited by the accompanying drawings. Indeed, the present invention is limited only by the following claims, and their legal equivalents.

What is claimed is:

1. A method for sending a data object to a user of a mobile communication device, comprising the steps of:
   receiving updated data from an external source at a first communication device;
   updating a stored data object associated with the first communication device using the updated data; and
   transferring, upon the occurrence of a trigger, the updated data object to a second mobile communication device, wherein the updated data object comprises the updated data;
   wherein the trigger comprises confirmation by a user of the first mobile communication device that the data object is to be shared.

2. The method of claim 1, wherein the external source comprises a server.

3. The method of claim 1, further comprising presenting the updated data object to the user of the of the second communication device.

4. The method of claim 1, wherein updating the stored data object comprises updating a data object stored on the first communication device.

5. A method for sending a data object to a user of a mobile communication device, comprising the steps of:
   receiving updated data from an external source at a first mobile communication device;
   updating a stored data object associated with the first mobile communication device using the updated data; and
   transferring, upon the occurrence of a trigger, the updated object to a second mobile communication device, wherein the updated data object comprises the updated data;
   wherein updating the stored data object comprises sending a request to a data object server to update the stored data object.

6. The method of claim 5, wherein transferring the updated data object to the second communication device comprises sending a request to a data object server to send the updated data object to the second communication device.

7. The method of claim 5, further comprising:
   storing the updated data object in addition to the data object; and
   selecting, in response to one or more user commands, the updated data object or the data object for display.

8. A first mobile communication device comprising processing logic configured to:
   receive updated data from an external source at the first mobile communication device;
   update a stored object associated with the first mobile communication device using the updated data; and
   transfer, upon the occurrence of a trigger, the updated object to a second mobile communication device, wherein the updated data object comprises the updated data;
   wherein the trigger comprises confirmation by a user of the first communication device that the data object is to be shared.

9. The first communication device of claim 8, wherein the processing logic is further configured to present the first data object to the user of the second communication device.

10. The first communication device of claim 8, wherein the processing logic is configured to update a data object stored on the first communication device.

11. A first mobile communication device comprising processing logic configured to;
    receive updated data from an external source at the first mobile communication device;
    update a stored data object associated with the first mobile communication device using the updated data; and
    transfer, upon the occurrence of a trigger, the updated data object to a second mobile communication device, wherein the updated data object comprises the updated data;
    wherein the processing logic is configured to update the stored data object by sending a request to a data object server to update the stored data object.

12. The first communication device of claim 11, wherein the processing logic is configured to transfer the updated data object to the second mobile communication device by sending a request to a data object server to send the updated data object to the second communication device.

13. The first communication device of claim 11, wherein the processing logic is further configured to:
    store the updated data object in addition to the data object; and
    select, in response to one or more user commands, the updated data object or the data object for display.

* * * * *